United States Patent [19]

Shaffer et al.

[11] 4,321,298

[45] Mar. 23, 1982

[54] CARBON FABRICS SEQUENTIALLY RESIN COATED WITH (1) A METAL-CONTAINING COMPOSITION AND (2) A BORON-CONTAINING COMPOSITION ARE LAMINATED AND CARBONIZED

[75] Inventors: Robert C. Shaffer, Playa del Rey; William L. Tarasen, Lakewood, both of Calif.

[73] Assignee: Hitco, Irving, Calif.

[21] Appl. No.: 124,931

[22] Filed: Feb. 26, 1980

[51] Int. Cl.$^3$ .................. B29C 25/00; B32B 9/00; B32B 31/26

[52] U.S. Cl. ................................ 428/242; 156/60; 156/245; 156/281; 264/29.5; 423/447.2; 427/203; 427/228; 428/246; 428/263; 428/265; 428/272; 428/283; 428/285; 428/328; 428/408

[58] Field of Search .............. 428/246, 242, 263, 265, 428/272, 283, 285, 328, 408; 156/60, 245, 281; 427/203, 228; 264/29.5; 423/447.2

[56] References Cited

U.S. PATENT DOCUMENTS

| | | | |
|---|---|---|---|
| 3,672,936 | 6/1972 | Ehrenreich | 428/366 |
| 4,087,482 | 5/1978 | Shaffer | 428/408 |
| 4,101,354 | 7/1978 | Shaffer | 428/365 |
| 4,185,043 | 1/1980 | Shaffer | 428/366 |

*Primary Examiner*—James C. Cannon
*Attorney, Agent, or Firm*—Roylance, Abrams, Berdo & Farley

[57] ABSTRACT

A fibrous carbon material is first coated with a thermosetting material which remains flexible after being subjected to curing temperatures. The thermosetting material contains a refractory metal capable of reacting with boron to form a metal boride. This thermosetting resin is then cured. The fibrous carbon material is then impregnated with a second thermosetting resin containing a boron compound and, optionally, a refractory metal capable of reacting with boron to form a metal boride. The second thermosetting resin is at least partially cured and a plurality of layers of the fibrous material is then assembled to form a laminate. The laminate is heated to a temperature sufficient to carbonize the thermosetting resin. The resultant carbon-carbon composite has better oxidation resistance, improved high temperature stability, higher density and improved interlaminar tensile strength than does a composite prepared without the presence of the refractory metal in the thermosetting resin.

57 Claims, No Drawings

CARBON FABRICS SEQUENTIALLY RESIN COATED WITH (1) A METAL-CONTAINING COMPOSITION AND (2) A BORON-CONTAINING COMPOSITION ARE LAMINATED AND CARBONIZED

BACKGROUND OF THE INVENTION

1. Field of the Invention

The present invention relates to carbon-carbon composites, and more particularly to composites made from fibrous carbon material, a thermosetting resin, a boron containing compound, and a refractory metal capable of reacting with said boron containing compound to form a metal boride. This invention also relates to fibrous carbon material impregnated with a thermosetting resin binder useful in the preparation of such carbon-carbon composites and to a method for making such composites.

2. Description of the Prior Art

It is known to use boron in the manufacture of carbon material such as graphite made from a filler such as graphite powder and graphitizable material such as pitch or a resin. The boron enhances the combination of the materials and the conversion thereof into graphite.

It is also known in the art to use boron in the manufacture of carbon-carbon composites comprised of fibrous carbon material such as carbon or graphite cloth and a thermosetting resin. Examples of this type of composite are disclosed in U.S. Pat. No. 3,672,936, issued June 27, 1972 to Leo C. Ehrenreich. The Ehrenreich patent recognizes that there is some improvement in interlaminar tensile strength as well as in oxidation resistance when a boron containing compound is added to the resin impregnated fibrous carbon material prior to carbonization of the resin.

U.S. Pat. No. 4,101,354 to Robert C. Shaffer discloses that the interlaminar tensile strength of carbon-carbon composites containing boron is greatly improved if the composite is heated to at least about 2150° C. during carbonization and graphitization and, further, that at such temperatures the tensile strength in the directions of the fibers of the fibrous carbon material typically decreases substantially, apparently due to a deterioration of the fibrous carbon material of the composite caused by reaction with boron at high temperatures. In accordance with the teachings of that patent, significant decrease in the tensile strength in the directions of the fibers of the fibrous carbon material is prevented by use of a protective coating on the fibers. The protective coating comprises a thermosetting material which remains flexible after being subjected to curing temperatures. The coating is applied to the fibers and cured prior to addition of a resin and a boron containing compound. The resin and boron containing compound may then be added with the resin being at least partially cured. Upon formation of a laminate and heating of the laminate to a temperature sufficient to carbonize and at least partially graphitize the resin, the interlaminar tensile strength has been found to be greatly improved without significant decrease in the tensile strength in the directions of the fibers of the fibrous carbon material of the laminate. The protective resin coating on the fibers creates a barrier and results in an anisotropic composite even though high levels of boron are present in the matrix. However, this barrier is insufficient to limit boron migration and to conserve the anisotropic nature of the composite when the high temperature consolidation temperature exceeds 2482° C. Above this temperature, the high levels of boron exhibit such instability that either an isotropic composite results or the composite fails by gross fracture.

BRIEF SUMMARY OF THE INVENTION

In accordance with the present invention, a mixture is made containing a refractory metal and a thermosetting resin which remains flexible after being subjected to curing temperatures. The metal may be in the form of a particulate metal or atomically dispersed metal or both. The metal is capable of reacting with boron at high temperatures in a ternary system of carbon. The fibrous carbon material is coated with this mixture and the thermosetting resin is cured. The coated fibrous carbon material is then reimpregnated with a second thermosetting resin containing a boron compound and, optionally, a refractory metal capable of reacting with boron to form a metal boride. As with the refractory metal in the first coating, the metal, if present, may be in the form of particulate metal or atomically dispersed metal or both. The second thermosetting resin is at least partially cured and a plurality of layers of the fibrous material is then assembled to form a laminate. The laminate is heated to a temperature sufficient to carbonize and graphitize the thermosetting resin. The resultant carbon-carbon composite has better oxidation resistance, improved high temperature stability, higher density and improved interlaminar tensile strength than does a composite prepared without the presence of the refractory metal in the thermosetting resin.

DESCRIPTION OF THE PREFERRED EMBODIMENTS

In accordance with the present invention, a fibrous carbon material is first coated with a flexible thermosetting resin which remains flexible upon curing. The thermosetting resin contains a refractory metal capable of reacting with boron to form a metal boride. The refractory metal may be atomically dispersed in the resin, i.e., wherein the refractory metal is an integral part of the molecular structure of the resin; or it may be particulate metal; or both may be used.

A thermosetting resin containing atomically dispersed metal may be prepared by incorporating the refractory metal into the resin in the form of a reaction product of either tungsten carbonyl and/or molybdenum carbonyl with pyrrolidine. An example of such a thermosetting resin comprises a copolymer of furfuryl alcohol and a polyester prepolymer, the polyester prepolymer having been reacted with a complex which is the reaction product of tungsten carbonyl and/or molybdenum carbonyl with pyrrolidine. Such copolymers are more fully disclosed in U.S. Pat. No. 4,087,482 to Robert C. Shaffer, the disclosure of which is incorporated herein by reference. Other thermosetting polymers containing chemically bonded metal atoms which have been prepared by the reaction of monomers and prepolymers with a complex which is a reaction product of tungsten carbonyl and/or molybdenum carbonyl with pyrrolidine are disclosed in Robert C. Shaffer U.S. patent applications Ser. No. 893,622, filed Apr. 5, 1978, now U.S. Pat. No. 4,185,043 and Ser. No. 06/084,310, filed Oct. 12, 1979. The disclosures of these two applications are incorporated herein by reference. After the resin has been prepared, it may be diluted with a suitable solvent, e.g., dimethylformamide, to a solids content of, for example, 70%.

The fibrous carbon material which may be used in the practice of this invention may comprise any carbon material which is in the form of fibers, filaments or other forms. Examples include fabrics such as carbon or graphite cloth. The use of the word "carbon" herein is intended to refer to carbon in all its forms including graphite.

In a preferred embodiment of this invention, the first coat of flexible thermosetting resin contains, in addition to atomically dispersed refractory metal, particulate refractory metal having a particle size of from 5 to 50 microns. Examples of such metal include niobium, tantalum, titanium, e.g., as titanium dioxide, molybdenum and tungsten. Any refractory metal may be used which converts to the stable boride in a ternary system with carbon. Preferably, from about 50 to 90% of the total refractory metal content of the resin is particulate metal, the remainder being atomically dispersed metal.

The flexible first coating is applied to the fibrous carbon material and cured using an appropriate technique. One process which may be used is to submerge the fibrous carbon material in an open container of the coating material, then remove excess coating material by drawing the fibrous carbon material through pressure rollers and then dry the coating by hanging the fibrous material in air at ambient temperature to permit evaporation of a portion of the solvent in the coating material. Curing of the coating material is then accomplished such as by placing the fibrous carbon material in an air circulating oven to advance the polymerization of the resin and remove additional solvent. The solids content of the thermosetting coating material is adjusted to produce a cured coating comprising approximately 5 to 200% of the weight of the fibrous carbon material.

Following application of the flexible coating, the fibrous carbon material is next reimpregnated with a second thermosetting resin which is partially cured or "B-staged". This resin may be the same as the flexible thermosetting resin. This resin may or may not contain an appropriate amount of atomically dispersed or particulate refractory metal, or both, such as previously described. This resin also contains a boron compound and the amount of boron should preferably be balanced on a molecular basis with the amount of metal present in the total system. The boron containing compound is preferably amorphous boron. Impregnation and curing can be accomplished by appropriate methods such as submerging the coated fibrous carbon material in an open container of the thermosetting resin containing the boron and, if desired, the refractory metal. Excess material is removed by drawing the fibrous carbon material between pressure rollers, after which the material is dried by hanging in air at ambient temperatures to permit evaporation of a portion of the solvent contained in the resin. The dried fibrous carbon material is then treated to at least partially cure the thermosetting resin such as by placing the material in an air circulating oven to advance the polymerization of the resin. The amount of amorphous boron blended with the resin is selected so that the amorphous boron comprises approximately 2 to 9% of the volume of the laminate.

The amount of the metal contained in the flexible thermosetting resin and the thermosetting resin containing the boron is preferably present in excess of the amount stoichiometrically necessary to combine with the boron present. Preferably, from about 75 to 100 weight percent of the total metal content of the laminate is present in the first flexible thermosetting resin coating, the remainder being present in the second thermosetting resin coating.

The resulting laminate is then preferably unified and densified with the resin matrix being further cured. In one process for accomplishing this, the laminate is placed in a conforming mold in an electrically heated platen press at elevated pressure and temperature for a time sufficient to provide the laminate with a relatively high degree of fiber-resin matrix adhesion and make it adequately self-supporting for maintenance of its shape and dimension through further processing.

The laminate is then carbonized and, preferably, at least partially graphitized, such as by heating at temperatures of from 2320° to 2870° C. and a pressure of from 500 to 3000 psi. Examples of carbonization and graphitization processes which can be used are provided by a copending application Ser. No. 556,889, filed Mar. 10, 1975, Richard J. Larsen et al, the disclosure of which is incorporated herein by reference. In the processes described in the Larsen et al application, a carbon-organic resin composite is initially shaped as by molding and at least partially precured. Thereafter, the composite is placed in an electric furnace where it is heated at a first rate to a temperature on the order of 1000° F. (538° C.) so as to substantially decompose the resin rapidly but without delamination or other damage to the composite. Heating is then continued at a second rate until the composite undergoes substantial softening and becomes plastic, typically at a temperature in excess of 3500° F. Thereafter, the composite is maintained at a high temperature, typically in excess of 5000° F. (2760° C.) for a selected period of time while at the same time continuing the application of high pressure to provide substantial densification of the composite. The continuous process provides for the manufacture of laminated articles of substantially all carbon composition and of very high density within a relatively short period of time and without the need for successive processing steps carried out in different locations or using different pieces of equipment.

The refractory metal and boron combination in the composite results in the formation of metal borides during the heat processing. The metal boride is considerably more stable at high temperature than is boron carbide. The migration of the boron is thus limited thereby preventing attack on the fiber by the boron and resultant degradation of the fibers. The presence of both the boron and the metal in the laminate exerts a synergistic effect on the interlaminar tensile strength of the final carbon-carbon composite.

The following examples illustrate this invention:

EXAMPLE 1

In an example carried out according to the invention, a grind is made containing 50% by weight of a resin made in accordance with Example 1 of Shaffer U.S. Pat. No. 4,087,482 and 50% by weight of particulate niobium which has a particle size of −325 mesh. The graphite fabric was submerged in an open container filled with the grind. The solids content of the grind was adjusted to produce a coating comprising approximately 175% by weight of the fabric. The fabric was drawn through pressure rollers to remove excess coating and was hung in air at ambient temperatures to dry. The fabric was then placed in an air circulating oven where the temperature was maintained at approximately 325° F. for approximately 60 minutes. This temperature treatment cured the resin sufficiently to prevent mixing with the resin in the second coat. The coated fabric was then further impregnated by being submerged in an open container holding a grind consisting of 87% by weight of a resin made in accordance with Example 1 of Shaffer U.S. Pat. No. 4,087,482, 5% by weight of ground graphite fiber, and 8% by weight of amorphous boron. Sufficient grind was added to apply about 120% by weight of the original weight of the fabric. The fabric was drawn between pressure rollers to remove excess resin and was dried by hanging in air at ambient temperature. Thereafter, the fabric was placed in an air circulating oven at a temperature of approximately 325° F. for a period of approximately 30 minutes, following which the temperature was raised to 400° F. for a period of approximately 10 minutes. This temperature treatment advanced the resin to the "B" stage. The impregnated fabric was then cut into sections of chosen size and shape that were laid up in a desired configuration. The laminate was unified and densified and the matrix material was further cured in a conforming mold in an electrically heated platen press at approximately 1000 psi and approximately 425° F. for approximately 16 hours. The length of time required for cure was found to be dependent on various factors including wall thickness and the shape of the part. When removed from the press, the part had a high degree of fiber-matrix adhesion. The part was adequately self-supporting for maintenance of its shape and dimension through further processing steps. The laminate was then fully carbonized, further compacted and carried to a graphite state while under a pressure of 1000–2000 psi. in equipment heated at temperatures of approximately 5200° F. by induction heating. This step completed the conversion of the resin matrix and advanced graphite crystallinity and the formation of metal borides in the matrix. The interlaminar tensile strength and tensile strength in the directions of the fibers of two different samples made according to this example were determined to be as follows:

|  | Sample 1 | Sample 2 |
| --- | --- | --- |
| Tensile strength in the direction of the fibers (psi): | 6436 | 6750 |
| Interlaminar tensile strength (psi): | 1731 | 1580 |

X-ray diffraction of Sample 1 showed a graphite peak of 3.35 A° which is highly graphitic, showing that the boron did promote graphitization. The X-ray analysis also showed NbC, $NbB_2$, and $\delta$-WB. No $B_4C$ was found. These results show complete reaction the boron with the metals present and the great molecular distances the boron will travel if subjected to high temperature and pressure.

EXAMPLE 2

A carbon-carbon composite was prepared as described in Example 1, except omitting the particulate niobium and using a high temperature consolidation temperature of 4200° F. (2316° C.). This composite contained only atomically dispersed tungsten, i.e., no particulate metal and an excess of boron on a molecular basis. This composite was found to have a tensile strength in the directions of the fibers of 9572 psi. and an interlaminar tensile strength of 2432 psi. This was a considerable improvement in interlaminar tensile strength over the carbon-carbon composites described in Schaffer U.S. Pat. No. 4,164,601, i.e., composites which did not contain a refractory metal. However, another carbon-carbon composite prepared in the same manner at high temperature consolidation temperature of 5200° F. (2871° C.) and containing only atomically dispersed tungsten showed a tensile strength in the direction of the fibers of only 2583 psi. with an interlaminar tensile strength of 2301 psi. These results showed degradation of the tensile strength in the direction of the fibers which results in an isotropic composite.

EXAMPLE 3

In order to conserve the fiber identity and the anisotropic nature of the composite, additional carbon-carbon composites were prepared as described in Example 1 which contained not only atomically dispersed tungsten, but, also, particulate refractory metal. This particulate metal was added to the barrier placed on the fiber in order to intercept the migrating boron. This additional metal did protect the fiber and resulted in stable composites. The four metals used were tantalum, titanium as titanium dioxide, molybdenum and tungsten substituted for the niobium of Example 1. The high temperature consolidation temperature used to prepare each composite was 5200° F.

The interlaminar tensile strength and tensile strength in the directions of the fibers were determined to be as follows:

|  | Metal Additive | | | |
| --- | --- | --- | --- | --- |
|  | $TiO_2$ | Mo | W | Ta |
| Tensile strength in the directions of the fibers (psi) | 7943 | 8617 | 8038 | 6042 |
| Interlaminar tensile strength (psi) | 1719 | 1624 | 868 | 1227 |

It will be seen that the addition of the particulate metal did not protect the fiber and resulted in stable composites. The tensile strength in the directions of the fibers for each of these samples, while lower than the composite prepared at a high temperature consolidation temperature of 4200° F. and containing only atomically dispersed tungsten, were considerably higher than the composite prepared at a high temperature consolidation temperature of 5200° F. and containing only atomically dispersed tungsten.

Analysis of data obtained from the composites of Examples 1, 2 and 3 shows these composites varied in fiber volume. To standardize the values to what normal composites could be expected to have at a normal fiber volume of 60%, the following chart is given.

| High Temperature Consolidation Temperature | 4200° F. | 5200° F. | 5200° F. | 5200° F. | 5200° F. | 5200° F. | 5200° F. |
| --- | --- | --- | --- | --- | --- | --- | --- |
| Metal Additive | * | * | $TiO_2$ | Nb | Mo | W | Ta |
| Tensile strength in the directions of the fibers |  |  |  |  |  |  |  |

| -continued | | | | | | | |
|---|---|---|---|---|---|---|---|
| (psi) standardized to 60% fiber volume. | 8948 | 2875 | 9046 | 7015 | 10141 | 10992 | 6068 |

*no particulate metal added.

This chart shows that the fiber was actually protected better at 5200° F. in three cases, e.g., with titanium dioxide, molybdenum, and tungsten systems, than the atomically dispersed system did at 4200° F.

It is thus seen that atomically dispersed metal alone will protect the fibers in composites from boron as long as the temperatures do not exceed 2482° C. and this protection is superior to the flexible furfuryl resin that does not contain metal, i.e., the resins disclosed in Shaffer U.S. Pat. No. 4,164,601. Fibers protected by the use of atomically dispersed metal offer an important weight saving as composites made without metal particulates exhibit lower densities than those made with metal particulates. However, the use of metal particulates aids in protection of the fibers when higher high temperature consolidation temperatures are used, e.g., higher than 2482° C.

What is claimed is:

1. A fibrous carbon material impregnated with a thermosetting resin binder, said thermosetting binder including:
   a first portion surrounding the fibers comprised of a flexible thermosetting resin coating containing a refractory metal capable of reacting with boron to form a metal boride; and
   a second portion coated on top of said first portion comprised of a thermosetting resin containing a boron compound.

2. A fibrous carbon material as defined in claim 1 wherein at least a part of said metal in said first portion of thermosetting resin is atomically dispersed.

3. A fibrous carbon material as defined in claim 1 wherein at least a part of said metal is particulate metal.

4. A fibrous carbon material as defined in claim 1 wherein a part of said metal is atomically dispersed and the remainder is particulate metal.

5. A fibrous carbon material as defined in claim 1 wherein said second portion of thermosetting resin also contains a metal capable of reacting with boron to form a metal boride.

6. A fibrous carbon material as defined in claim 5 wherein at least a part of said metal in said second portion of thermosetting resin is atomically dispersed.

7. A fibrous carbon material as defined in claim 5 wherein at least a part of said metal in said second portion of thermosetting resin is particulate metal.

8. A fibrous carbon material as defined in claim 5 wherein at least a part of said metal in said second portion of thermosetting resin is atomically dispersed and the remainder is particulate metal.

9. A carbon-carbon composite comprising a plurality of layers of fibrous carbon material in a carbon matrix, said carbon matrix including metal boride, wherein said resin matrix is formed from:
   a first portion of thermosetting resin surrounding the fibers comprised of a flexible thermosetting resin coating containing a refractory metal capable of reacting with boron to form a metal boride; and
   a second portion coated on top of said first portion comprised of a thermosetting resin containing a boron compound.

10. A carbon-carbon composite as defined in claim 9 wherein at least a part of said metal in said first portion of thermosetting resin is atomically dispersed.

11. A carbon-carbon composite as defined in claim 9 wherein at least a part of said metal is particulate metal.

12. A carbon-carbon composite as defined in claim 9 wherein a part of said metal is atomically dispersed and the remainder is particulate metal.

13. A carbon-carbon composite as defined in claim 9 wherein said second portion of thermosetting resin also contains a metal capable of reacting with boron to form a metal boride.

14. A carbon-carbon composite as defined in claim 13 wherein at least a part of said metal in said second portion of thermosetting resin is atomically dispersed.

15. A carbon-carbon composite as defined in claim 13 wherein at least a part of said metal in said second portion of thermosetting resin is particulate metal.

16. A carbon-carbon composite as defined in claim 13 wherein at least a part of said metal in said second portion of thermosetting resin is atomically dispersed and the remainder is particulate metal.

17. A fibrous carbon material impregnated with a thermosetting resin binder, said thermosetting binder including:
   a first portion surrounding the fibers comprised of a flexible thermosetting resin coating containing a refractory metal capable of reacting with boron to form a metal boride, at least a part of said metal being atomically dispersed and being chemically combined in said thermosetting resin in the form of a reaction product of either tungsten carbonyl and/or molybdenum carbonyl with pyrrolidine; and
   a second portion coated on top of said first portion comprised of a thermosetting resin containing a boron compound.

18. A fibrous carbon material as defined in claim 17 wherein said first portion thermosetting resin comprises a copolymer of furfuryl alcohol and a polyester prepolymer, said polyester prepolymer having been reacted with a complex which is a reaction product of tungsten carbonyl and/or molybdenum carbonyl with pyrrolidine.

19. A fibrous carbon material as defined in claim 17 wherein a part of said metal is particulate metal.

20. A fibrous carbon material as defined in claim 17 wherein said second portion of thermosetting resin also contains a metal capable of reacting with boron to form a metal boride.

21. A fibrous carbon material as defined in claim 20 wherein at least a part of said metal in said second portion of thermosetting resin is atomically dispersed.

22. A fibrous carbon material as defined in claim 21 wherein said metal in said second portion of thermosetting resin is chemically combined in said thermosetting resin in the form of a reaction product of either tungsten carbonyl and/or molybdenum carbonyl with pyrrolidine.

23. A fibrous carbon material as defined in claim 22 wherein said second portion of thermosetting resin comprises a copolymer of furfuryl alcohol and a polyester prepolymer, said polyester prepolymer having been reacted with a complex which is a reaction product of tungsten carbonyl and/or molybdenum carbonyl with pyrrolidine.

24. A fibrous carbon material as defined in claim 20 wherein a part of said metal in said second portion of thermosetting resin is particulate metal.

25. A fibrous carbon material impregnated with a thermosetting resin binder, said thermosetting binder including:
 a first portion surrounding the fibers comprised of a flexible thermosetting resin coating containing a refractory metal capable of reacting with boron to form a metal boride; and
 a second portion coated on top of said first portion comprised of a thermosetting resin containing a boron compound and a metal capable of reacting with boron to form a metal boride, at least a part of said metal in said second portion of thermosetting resin being atomically dispersed and being chemically combined in said thermosetting resin binder in the form of a reaction product of either tungsten carbonyl and/or molybdenum carbonyl with pyrrolidine.

26. A fibrous carbon material as defined in claim 25 wherein said second portion of thermosetting resin comprises a copolymer of furfuryl alcohol and a polyester prepolymer, said polyester prepolymer having been reacted with a complex which is a reaction product of tungsten carbonyl and/or molybdenum carbonyl with pyrrolidine.

27. A fibrous carbon material as defined in claim 25 wherein a part of said metal in said second portion of thermosetting resin is particulate metal.

28. A carbon-carbon composite comprising a plurality of layers of fibrous carbon material in a carbon matrix, said carbon matrix including metal boride, wherein said resin matrix is formed from:
 a first portion of thermosetting resin surrounding the fibers comprised of a flexible thermosetting resin coating containing a refractory metal capable of reacting with boron to form a metal boride, at least a part of said metal being atomically dispersed and being chemically combined in said thermosetting resin binder in the form of a reaction product of either tungsten carbonyl and/or molybdenum carbonyl and pyrrolidine; and
 a second portion coated on top of said first portion comprised of a thermosetting resin containing a boron compound.

29. A carbon-carbon composite as defined in claim 28 wherein a part of said metal is particulate metal.

30. A carbon-carbon composite as defined in claim 29 wherein said first portion of thermosetting resin comprises a copolymer of furfuryl alcohol and a polyester prepolymer, said polyester prepolymer having been reacted with a complex which is a reaction product of tungsten carbonyl and/or molybdenum carbonyl with pyrrolidine.

31. A carbon-carbon composite as defined in claim 28 wherein said second portion of thermosetting resin also contains a metal capable of reacting with boron to form a metal boride.

32. A carbon-carbon composite as defined in claim 31 wherein at least a part of said metal in said second portion of thermosetting resin is atomically dispersed.

33. A carbon-carbon composite as defined in claim 32 wherein said metal in said second portion of thermosetting resin is chemically combined in said thermosetting resin in the form of a reaction product of either tungsten carbonyl and/or molybdenum carbonyl with pyrrolidine.

34. A carbon-carbon composite as defined in claim 33 wherein said second portion of thermosetting resin comprises a copolymer of furfuryl alcohol and a polyester prepolymer, said polyester prepolymer having been reacted with a complex which is a reaction product of tungsten carbonyl and/or molybdenum carbonyl with pyrrolidine.

35. A carbon-carbon composite as defined in claim 31 wherein a part of said metal in said second portion of thermosetting resin is particulate metal.

36. A carbon-carbon composite comprising a plurality of layers of fibrous carbon material in a carbon matrix, said carbon matrix including metal boride, wherein said resin matrix is formed from:
 a first portion surrounding the fibers comprised of a flexible thermosetting resin coating containing a refractory metal capable of reacting with boron to form a metal boride; and
 a second portion coated on top of said first portion comprised of a thermosetting resin containing a boron compound and a metal capable of reacting with boron to form a metal boride, at least a part of said metal in said second portion of thermosetting resin being atomically dispersed and being chemically combined in said thermosetting resin binder in the form of a reaction product of either tungsten carbonyl and/or molybdenum carbonyl with pyrrolidine.

37. A carbon-carbon composite as defined in claim 36 wherein said second portion of thermosetting resin comprises a copolymer of furfuryl alcohol and a polyester prepolymer, said polyester prepolymer having been reacted with a complex which is a reaction product of tungsten carbonyl and/or molybdenum carbonyl with pyrrolidine.

38. A fibrous carbon material as defined in claim 36 wherein a part of said metal in said second portion of thermosetting resin is particulate metal.

39. A method of making a carbon-carbon composite comprising the steps of:
 applying a coating of a flexible thermosetting resin which remains flexible upon curing to fibrous carbon material, said resin containing a refractory metal capable of reacting with boron to form a metal boride;
 curing the flexible thermosetting resin;
 impregnating the fibrous carbon material with a second thermosetting resin containing a boron compound;
 at least partially curing the second thermosetting resin;
 assembling a plurality of layers of the fibrous carbon material to form a laminate; and
 heating the laminate to a temperature sufficient to carbonize the thermosetting resin.

40. A method as defined in claim 39 wherein at least a part of said metal in said flexible thermosetting resin is atomically dispersed.

41. A method as defined in claim 39 wherein at least a part of said metal is particulate metal.

42. A method as defined in claim 39 wherein a part of said metal is atomically dispersed and the remainder is particulate metal.

43. A method as defined in claim 39 wherein said second thermosetting resin also contains a metal capable of reacting with boron to form a metal boride.

44. A method as defined in claim 43 wherein at least a part of said metal in said second thermosetting resin is atomically dispersed.

45. A method as defined in claim 43 wherein at least a part of said metal in said second thermosetting resin is particulate metal.

46. A method as defined in claim 43 wherein a part of said metal in said second thermosetting resin is atomically dispersed and the remainder is particulate metal.

47. A method of making a carbon-carbon composite comprising the steps of:

applying a coating of a flexible thermosetting resin which remains flexible upon curing to fibrous carbon material, said resin containing a refractory metal capable of reacting with boron to form a metal boride, at least a part of said metal being atomically dispersed and being chemically combined in said thermosetting resin in the form of a reaction product of either tungsten carbonyl and/or molybdenum carbonyl with pyrrolidine;

curing the flexible thermosetting resin;

impregnating the fibrous carbon material with a second thermosetting resin containing a boron compound;

at least partially curing the second thermosetting resin;

assembling a plurality of layers of the fibrous carbon material to form a laminate; and heating the laminate to a temperature sufficient to carbonize the thermosetting resin.

48. A method as defined in claim 47 wherein said flexible thermosetting resin comprises a copolymer of furfuryl alcohol and a polyester prepolymer, said polyester prepolymer having been reacted with a complex which is a reaction product of tungsten carbonyl and/or molybdenum carbonyl with pyrrolidine.

49. A method as defined in claim 47 wherein a part of said metal is particulate metal.

50. A method as defined in claim 47 wherein said second thermosetting resin also contains a metal capable of reacting with boron to form a metal boride.

51. A method as defined in claim 50 wherein at least a part of said metal in said second thermosetting resin is atomically dispersed.

52. A method as defined in claim 51 wherein said metal in said second thermosetting resin is chemically combined in said thermosetting resin in the form of a reaction product of either tungsten carbonyl and/or molybdenum carbonyl with pyrrolidine.

53. A method as defined in claim 52 wherein said second thermosetting resin comprises a copolymer of furfuryl alcohol and a polyester prepolymer, said polyester prepolymer having been reacted with a complex which is a reaction product of tungsten carbonyl and/or molybdenum carbonyl with pyrrolidine.

54. A method as defined in claim 50 wherein a part of said metal in said second thermosetting resin is particulate metal.

55. A method of making a carbon-carbon composite comprising the steps of:

applying a coating of a flexible thermosetting resin which remains flexible upon curing to fibrous carbon material, said resin containing a refractory metal capable of reacting with boron to form a metal boride;

curing the flexible thermosetting resin;

impregnating the fibrous carbon material with a second thermosetting resin containing a boron compound and a metal capable of reacting with boron to form a metal boride, at least a part of said metal in said second portion of thermosetting resin being atomically dispersed and being chemically combined in said thermosetting resin binder in the form of a reaction product of either tungsten carbonyl and/or molybdenum carbonyl with pyrrolidine;

at least partially curing the second thermosetting resin;

assembling a plurality of layers of the fibrous carbon material to form a laminate; and heating the laminate to a temperature sufficient to carbonize the thermosetting resin.

56. A method as defined in claim 55 wherein said second thermosetting resin comprises a copolymer of furfuryl alcohol and a polyester prepolymer, said polyester prepolymer having been reacted with a complex which is a reaction product of tungsten carbonyl and/or molybdenum carbonyl with pyrrolidine.

57. A method as defined in claim 55 wherein a part of said metal in said second thermosetting resin is particulate metal.

* * * * *